United States Patent
Crunk et al.

(10) Patent No.: US 6,199,027 B1
(45) Date of Patent: Mar. 6, 2001

(54) ADAPTABLE ENGINE TACHOMETER DEVICE

(76) Inventors: Paul D. Crunk, 12220 Woodcrest St., Taylor, MI (US) 48180; Michael Zarucki, 40 Draycott Road, Granley Fields, Cheltenham, Gloucestershire GL51 6LY (GB)

(*) Notice: Subject to any disclaimer, the term of this patent is extended or adjusted under 35 U.S.C. 154(b) by 0 days.

(21) Appl. No.: 09/024,043

(22) Filed: Feb. 16, 1998

(51) Int. Cl.$^7$ .................................................. B65D 13/02
(52) U.S. Cl. .............................. 702/142; 702/141; 701/96
(58) Field of Search ........................... 702/142; 701/115, 701/96; 324/391

(56) References Cited

U.S. PATENT DOCUMENTS

| 3,948,039 | 4/1976 | Leveraus . | |
|---|---|---|---|
| 4,350,952 | 9/1982 | Holt et al. | 324/166 |
| 4,611,570 | * 9/1986 | Nash | 123/601 |
| 5,353,953 | 10/1994 | Sakaemura | 220/602 |
| 5,431,134 | * 7/1995 | Budde et al. | 123/146.5 A |

* cited by examiner

*Primary Examiner*—Kamini Shah
(74) *Attorney, Agent, or Firm*—Harness, Dickey & Pierce, P.L.C.

(57) ABSTRACT

An engine tachometer device for determining the revolutions per minute of an engine which generates sparks and has a predetermined configuration. A computer memory is utilized for storing engine configuration data. The engine configuration data associates engine configurations with predetermined equations. An engine configuration selector selects from the computer memory one of the engine configurations which is indicative of the configuration of the engine. An engine characteristic calculator which is connected to the engine and to the engine configuration selector and to the computer memory determines the revolutions per minute of the engine based upon the generated sparks and upon the equation associated with the selected engine configuration. Accordingly, the device accurately monitors the RPM of all configurations of engines.

20 Claims, 13 Drawing Sheets

ADAPTABLE ENGINE TACHOMETER DEVICE

BACKGROUND OF THE INVENTION

The present invention relates to engine monitoring devices, and more particularly to adaptable engine monitoring devices.

SUMMARY OF THE INVENTION

Engine monitoring is used throughout many industries to determine performance of an engine as well as to determine when servicing of an engine is needed. For example, the automotive industry examines such engine characteristics as the revolutions per minute of an engine over a period of time in order to assess the engine's performance and to determine when the engine might need servicing.

Industries use many different engine configurations that can range from one to eight cylinders and from two to four strokes. However, present engine monitoring devices are not adaptable for accurately monitoring these different configurations since they are specifically designed to monitor only one or two engine configurations.

Accordingly, it is a feature of the present invention to provide an engine tachometer device that is adaptable to all configurations of engines. It is another feature of the present invention to provide a device in a self-contained case that can accurately monitor all configurations of engines. It is yet another feature of the present invention to provide engine servicing indications based upon the monitored engine.

In accordance with one aspect of the present invention, an engine tachometer device is provided for determining the revolutions per minute of an engine which generates sparks and has a predetermined configuration. A computer memory is utilized for storing engine configuration data. The engine configuration data associates engine configurations with predetermined equations. An engine configuration selector selects from the computer memory one of the engine configurations which is indicative of the configuration of the engine. An engine characteristic calculator which is connected to the engine and to the engine configuration selector and to the computer memory determines the revolutions per minute of the engine based upon the generated sparks and upon the equation associated with the selected engine configuration.

Additional objects and advantages of the present invention will be apparent from the detailed description of the preferred embodiment, the appended claims in the accompanying drawings, or may be learned by practice of the invention.

BRIEF DESCRIPTION OF THE DRAWINGS

The accompanying drawings which are incorporated in and constitute part of the specification, illustrate an embodiment of the present invention and together, with the description, serve to explain the principles of the invention. In the drawings, the same reference numeral indicates the same parts.

DETAILED DESCRIPTION OF THE PREFERRED EMBODIMENT

Figure 1:
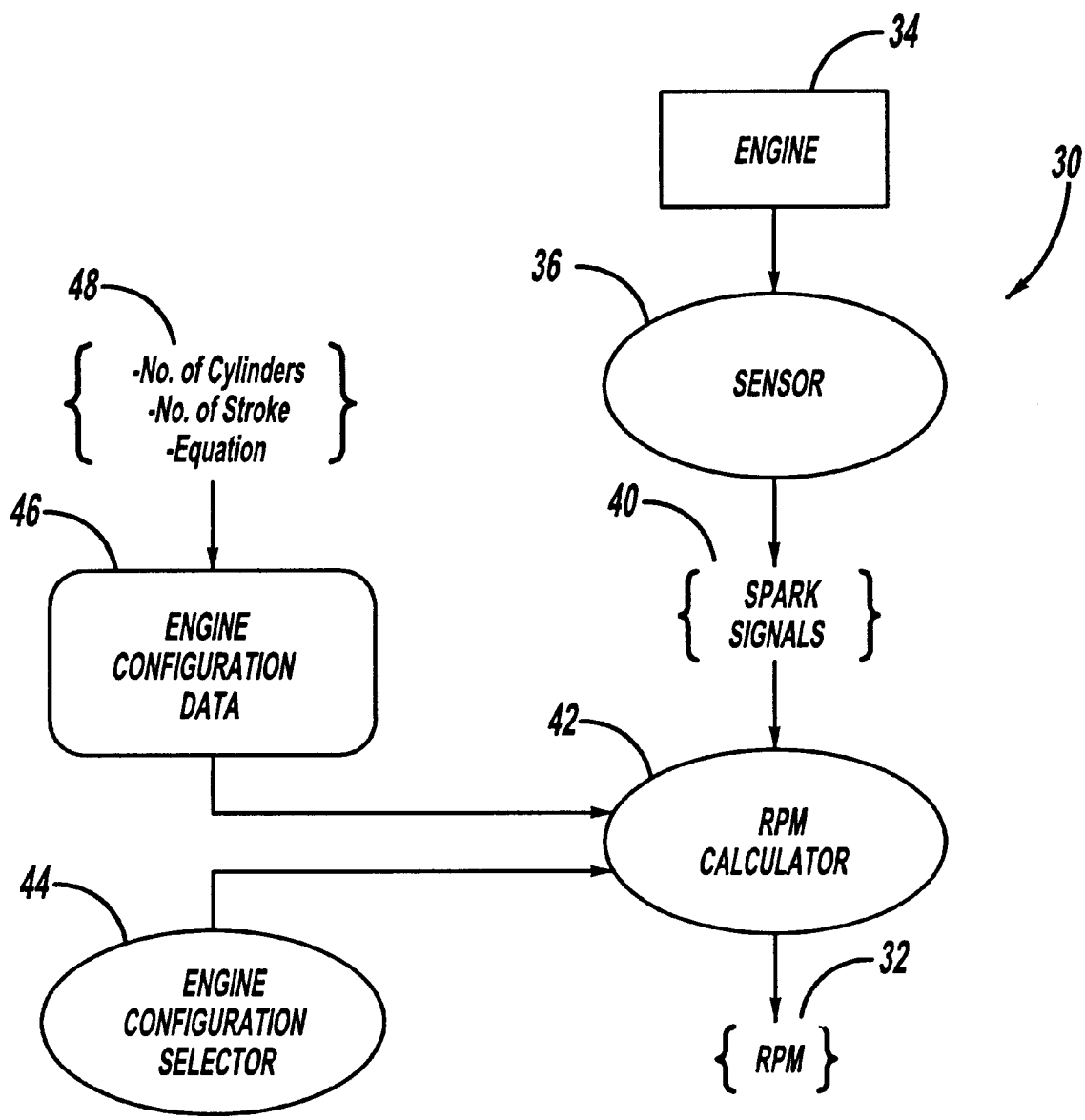
FIG. 1 is a block diagram showing the data flow among the components of the present invention.

Turning to the Figures, particularly FIG. 1, an adaptable engine tachometer device is illustrated and generally designated with the reference numeral 30. The adaptable engine tachometer device 30 determines the revolutions per minute (rpm 32) for many different configurations of engines. Various engine configurations include, but are not limited to, engine cylinder configurations ranging from single cylinder engines (e.g., lawn mowers, chain saws, etc.) to eight cylinder engines (e.g., an eight cylinder automobile engine), as well as engines that are two or four stroke engines.

Within the present invention, sensor 36 senses sparks emitted by running engine 34. Based upon the sensed sparks, sensor 36 provides spark signals 40 to rpm calculator 42. RPM calculator 42 determines the rpm 32 of running engine 34 based upon spark signals 40 and a selected equation.

A user of the present invention operates an engine configuration selector 44 in order to indicate to the rpm calculator 42 the configuration of engine 34. In this manner, the present invention takes into account the engine configuration when it calculates the RPM based upon the input signal from engine 34. For example, for a three cylinder engine the present invention takes into account that the input signal is from a three cylinder engine.

RPM calculator 42 selects an equation from engine configuration data 46 that matches the configuration of engine 34. Engine configuration data 46 associates a particular engine configuration with a particular equation as shown by reference numeral 48. In the preferred embodiment, the present invention utilizes the number of cylinders and the number of strokes to express the configuration of engine 34.

However, it is to be understood that the present invention is not limited to utilizing the number of cylinders and the number of strokes for the engine configuration data 46, but also includes utilizing only the number of cylinders as the engine configuration information in engine configuration data 46. Moreover, in another embodiment of the present invention, only the number of strokes is used as the engine configuration information in engine configuration data 46.

Figure 2:
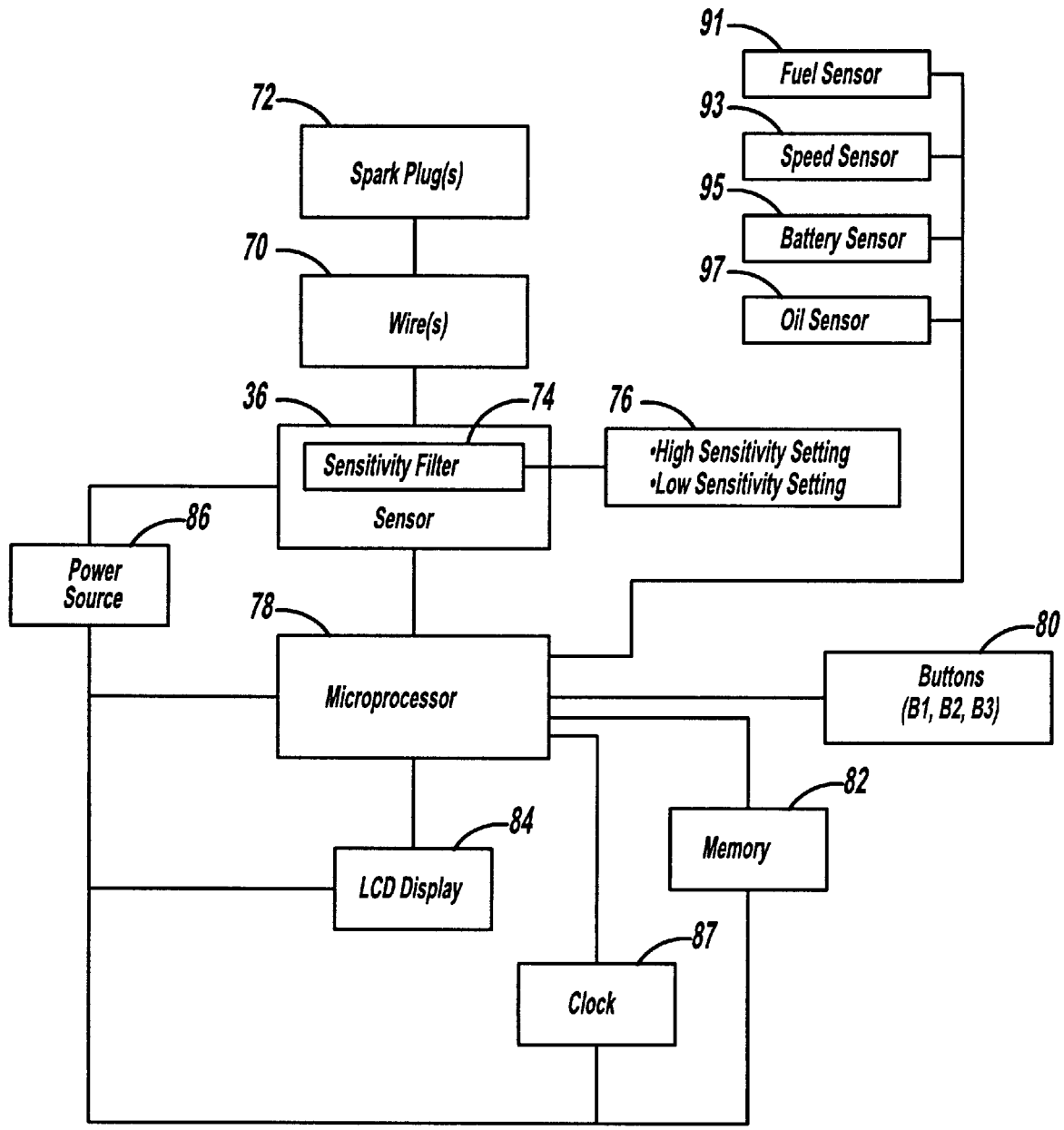
FIG. 2 is a block diagram showing the interconnections among the components of the present invention.

FIG. 2 depicts the components of the present invention and their interconnections. Wires 70, preferably eighteen gauge, connect spark plugs 72 of an engine to sensor 36. Sensor 36 contains a sensitivity filter 74 in order to have the capability of adjusting the sensitivity of sensor 36 to detect the firings of spark plugs 72. In the preferred embodiment, sensitivity filter 74 has a high sensitivity setting and a low sensitivity setting as depicted by reference numeral 76. A high sensitivity setting enables the present invention to detect all firings of spark plugs 72. A low sensitivity setting enables the present invention to look for one spark and ignore all other sparks.

Microprocessor 78 sets sensitivity filter 74 at one of these settings by adjusting the gain of sensitivity filter 74. A low gain setting picks up the strongest sparks. A high gain setting picks up as many sparks as possible. In this manner, the present invention is able to pick up a spark signal from a combination of spark leads. For example, on an eight cylinder engine, the present invention picks up a signal from just one spark lead or it could pick up a combined signal from all eight spark leads together based upon the sensitivity setting.

Microprocessor 78 is instructed by a user of the present invention to use a particular sensitivity value by buttons 80. Buttons 80 preferably includes three buttons (B1, B2, B3) which indicate to microprocessor 78 such items of information as the sensitivity setting, the configuration of the engine, and other items that are discussed more fully below.

Microprocessor 78 utilizes memory 82 to store the equations associated with a particular engine configuration in order to determine the rpm of an engine. Memory 82 also stores the intermediate calculations of microprocessor 78 that are generated during determination of the rpm of the engine. In the preferred embodiment, memory 82 is a complementary metallic-oxide semiconductor chip as may be obtained from Arizona Microchip and has 128 bytes of RAM. Moreover, microprocessor 78 is preferably a PIC16C923 and is available from Arizona Microchip.

The results of the calculations by the microprocessor 78 are made visible to the user via a display 84. Display 84 also provides to the user the current set values and configuration data of the present invention. In the preferred embodiment display 84 is a liquid crystal display (LCD).

Power source 86 supplies electrical power to the various components of the present invention. In the preferred embodiment, a lithium three volt CR2032 battery is used. Also, clock 87 is provided to provide timing information to microprocessor 78. The preferred embodiment uses the clock already contained within the PIC16C923.

Additionally, the present invention includes monitoring other aspects of a vehicle through connection to fuel sensor 91, speed sensor 93, and battery sensor 95. The monitored aspects of the vehicle are provided as readouts on the same device of the present invention as that which provides monitoring and readout of an engine's RPM.

In the preferred embodiment, fuel sensor 91 includes a flotation device in a vehicle's fuel tank to monitor the amount of fuel remaining in the tank. Speed sensor 93 includes monitoring the rotation of a vehicle's tire and calculating the speed of the vehicle based upon the number of rotations per unit time and upon the geometry of the vehicle's tire. Battery sensor 95 includes monitoring the voltage of the vehicle's battery.

It should be understood that the present invention is not limited to monitoring only these aspects of a vehicle, but includes monitoring such other aspects of a vehicle as monitoring and providing readouts to a user of such other aspects as the oil pressure of a vehicle through oil sensor 97.

Figure 3:
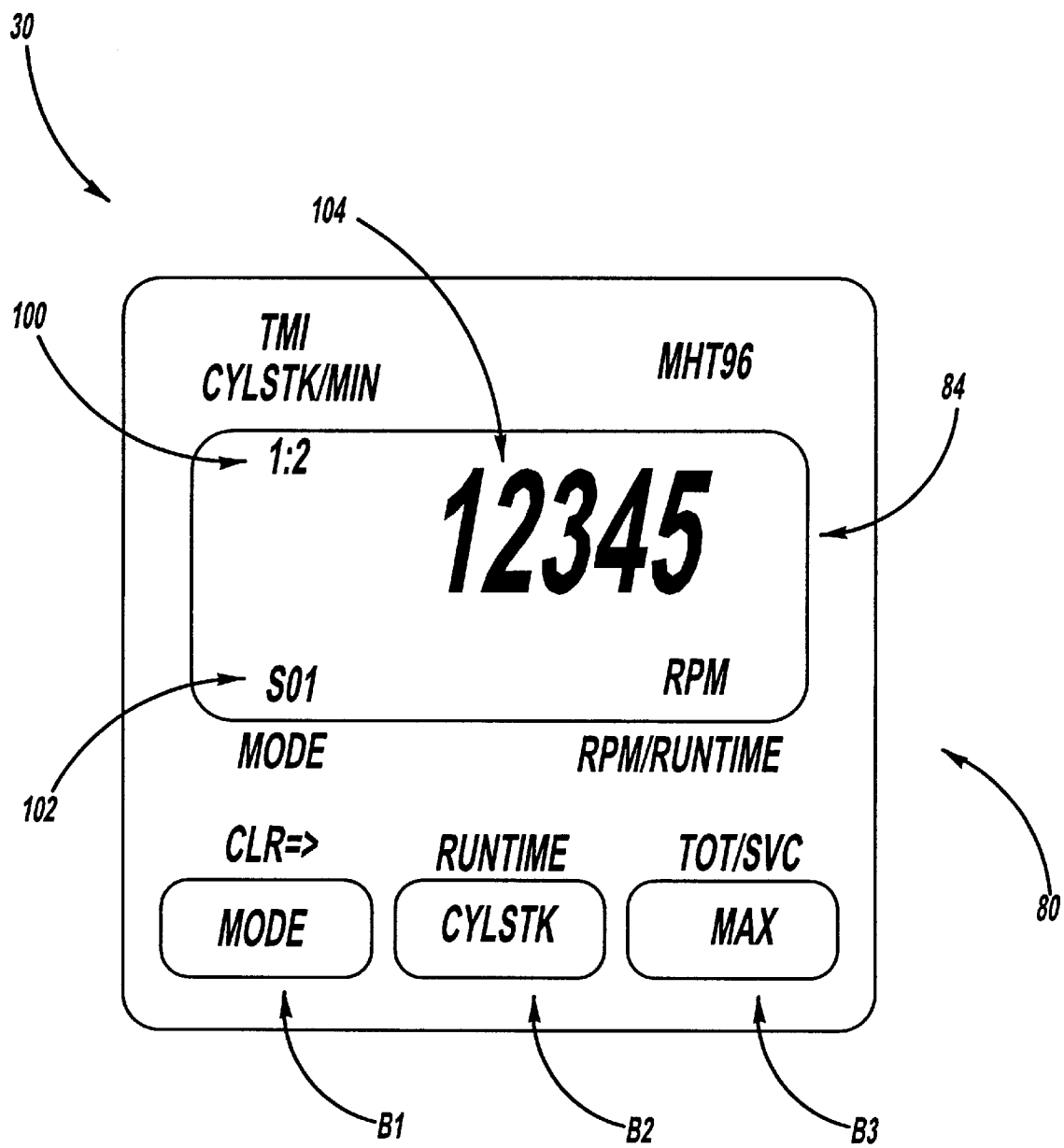
FIG. 3 is a front view depicting an embodiment of the display and button configuration for the present invention.

FIG. 3 depicts an embodiment of the adaptable engine tachometer device 30. The adaptable engine tachometer device 30 is a self-contained device with the following length/width/depth dimensions: 60×80×15 millimeters. Three buttons 80 (B1, B2, B3) are provided below the display 84 in order to switch device 30 between its various functions and modes.

Within display 84 is contained a visual indication region 100 for the current setting of the engine configuration. Moreover, visual indication region 102 indicates the particular mode which device 30 is in. Visual indication region 104 provides the calculated RPM of the engine as well as other engine-related information (e.g., maximum RPM and engine service-related information).

Figure 4:
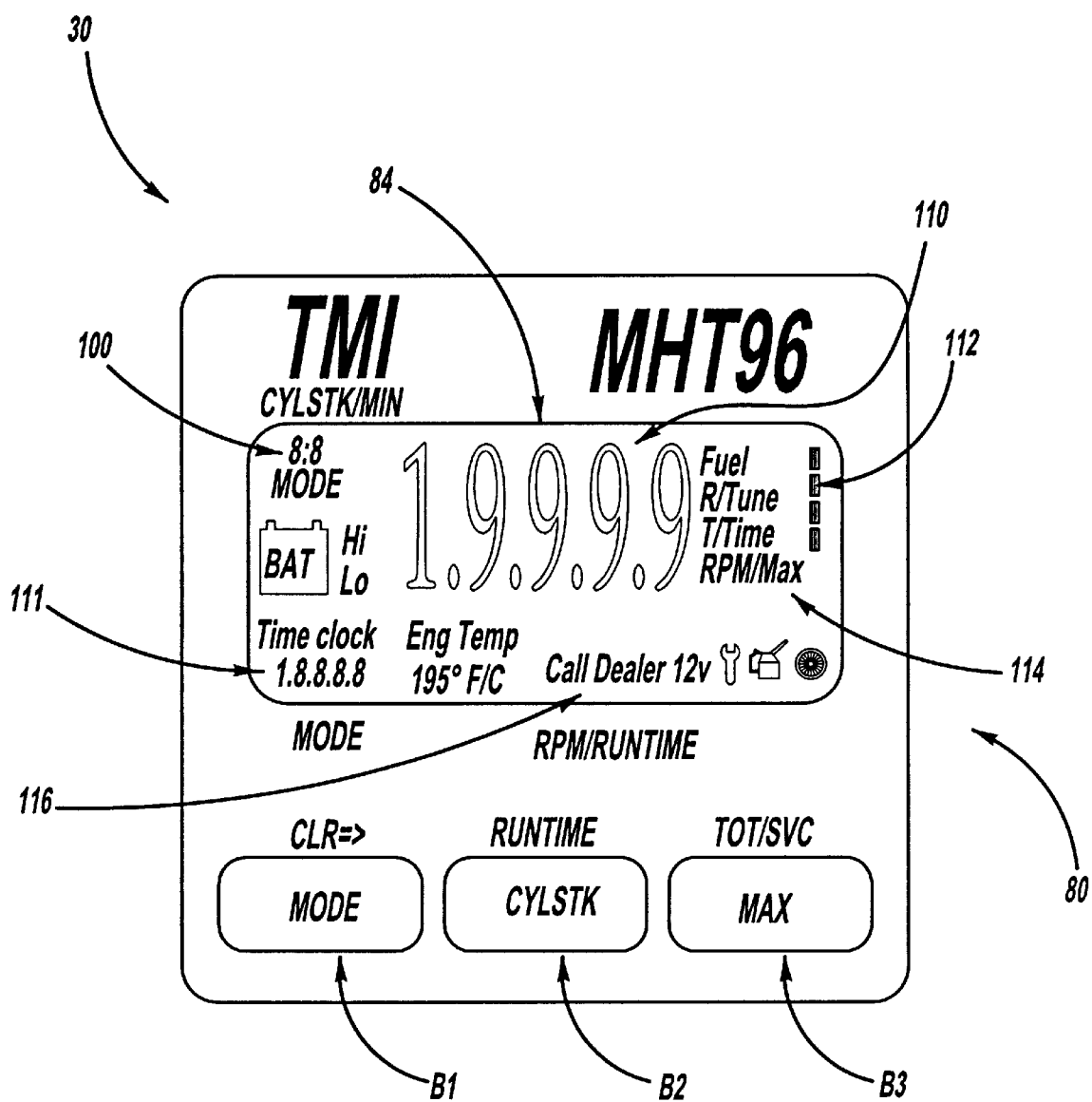
FIG. 4 is a front view depicting the preferred embodiment of the display and button configuration for the present invention.

FIG. 4 shows the preferred embodiment of device 30 which provides additional functionality and information to the user (versus the embodiment depicted in FIG. 3). For example, either the rpm or miles per hour (mph) information can be displayed as shown at reference numeral 110. At reference numeral 111, the following information is displayed: RPM, MPH, St1, St2. At reference numeral 112, a fuel bar is displayed in order to show fuel level.

Moreover, the mode (which device 30 is in) is displayed at reference numeral 114.

Engine service-related information is displayed at reference numeral 116 in order to inform the user that the engine is possibly in need of some type of service. For example, device 30 is capable of determining how long an engine has been running and informing the user that a specified amount of time has elapsed and that the engine might require servicing.

Figure 5:
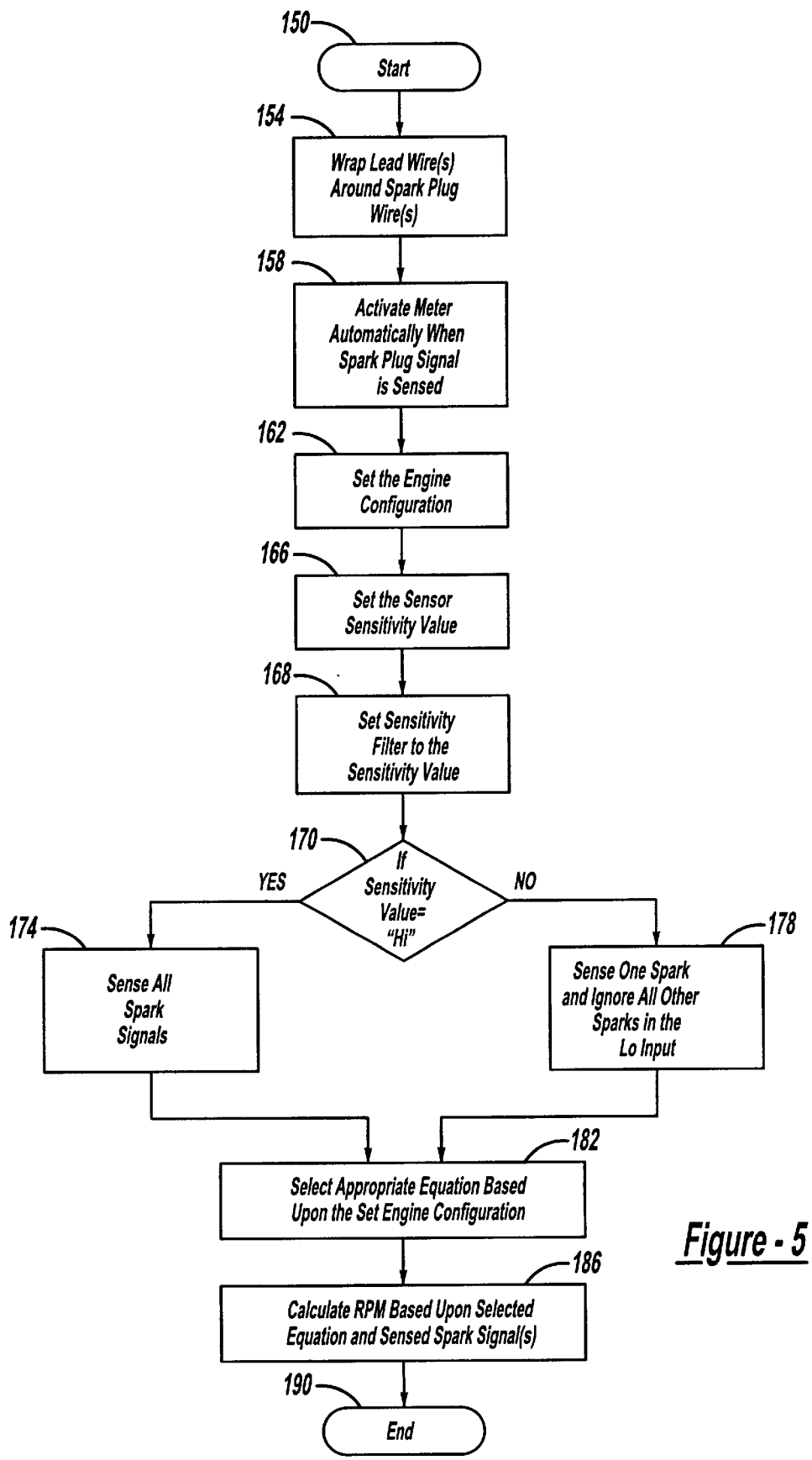
FIG. 5 is a flowchart depicting the operational steps to calculate the revolutions per minute (rpm) according to the techniques of the present invention.

FIG. 5 is a flow chart depicting the steps to determine the RPM of a running engine. Start indication block 150 indicates that process block 154 is to be executed. At process block 154, Ariel lead wires are wrapped around a spark plug lead several times across the proper number of spark leads for the engine configuration setting. At process block 158, the sensor turns on the adaptable engine tachometer device automatically when a spark signal is sensed from the running engine.

The particular engine configuration of the running engine is inputted into the device at process block 162. At process block 166, the microprocessor displays "high" or "low" values below the displayed engine configuration setting on the device so that the user can select the particular sensor sensitivity value. Process block 168 sets the sensitivity filter to the sensitivity value that was established in process block 166.

At decision block 170, if the user has selected a "high" sensitivity value, then process block 174 is performed wherein the microprocessor looks for all spark signals from the sensor. However, if the sensitivity value is set to "low", then process block 178 is performed wherein the sensitivity pickup of the sensor is such that the sensor looks only for one particular spark signal and ignores all other sparks in the low input (n.b.: the term "low input" refers to "ghost sparks" which have a lower voltage than the one particular spark; i.e., the closest spark which the pickup lead is wrapped around).

At process block 182, the microprocessor uses the RPM calculation equation based upon the engine configuration that was selected at process block 162:

$$RPM = \frac{(T1 \text{ Spark Count} * \text{Constant})}{(T0 \text{ Period Count})}$$

T0 is set as period timer at preferably 61 microsecond resolution and starts with the synchronization spark and ends with the last spark detected. T1 is set as a sparks counter. The following table depicts the constants used to calculate the RPM:

| Engine Configuration | | |
|---|---|---|
| Cylinder | Stroke | Constant |
| 1 | 2 | 983040 |
| 1 | 4 | 1966080 |
| 2 | 2 | 491520 |
| 2 | 4 | 983040 |
| 3 | 2 | 327680 |
| 3 | 4 | 655360 |
| 4 | 2 | 245760 |
| 4 | 4 | 491520 |
| 5 | 2 | 196608 |
| 5 | 4 | 393216 |
| 6 | 2 | 163840 |
| 6 | 4 | 327680 |
| 7 | 2 | 140434 |
| 7 | 4 | 280686 |
| 8 | 2 | 122880 |
| 8 | 4 | 245760 |

Based upon the selected equation and sensed spark signals, process block 186 calculates the RPM of the running engine before terminating at end block 190.

An example of the calculations performed by process block 186 is the following. If a single cylinder/two stroke engine is operating at 3000 RPM, the present invention performs the following calculations:

Mode=1:2 (Constant=983040)

This engine produces 1 revolution per spark

3000 RPM=50 sparks per Second (1 rev per spark)

T0 Timebase=61 uS per count

Sample time=1 Second

T0 Period Count=$\frac{1}{61}$ uS=16384 (over a 1 second sample period)

T1 Spark Count=50 Sparks (over a 1 second sample period)

Therefore, RPM=(50 * 983040)/16384=3000

If a single cylinder/four stroke engine is operating at 3000 RPM, the present invention performs the following calculations:

Mode=1:4 (Constant=1966080)

This engine will give 2 revolutions per spark

3000 RPM=25 sparks per Second (2 rev per spark)

T0 Timebase=61 uS per count

Sample time=1 Second

T0 Period Count=$\frac{1}{61}$ uS=16384 (over a 1 second sample period)

T1 Spark Count=25 Sparks (over a 1 second sample period)

Therefore, RPM=(25 * 1966080)/16384=3000

Similar calculations are performed for engines that have more cylinders than one.

Figure 6:
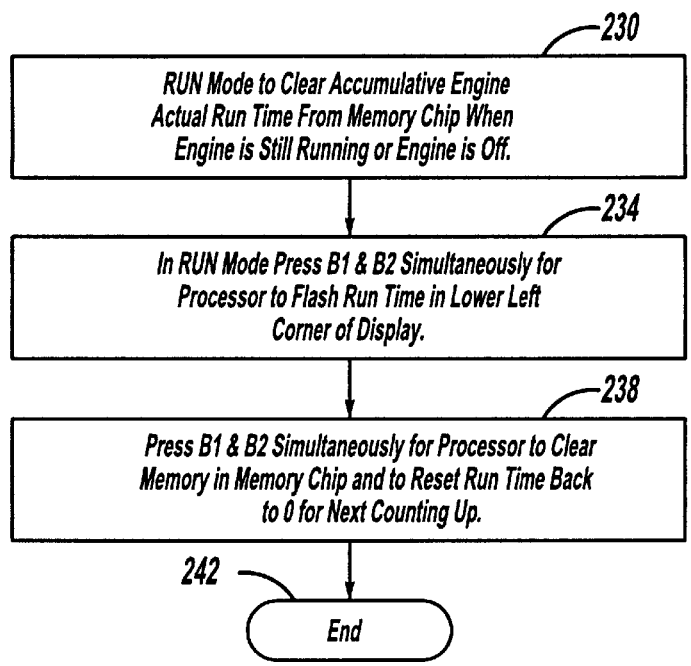
FIG. 6 is a flowchart depicting the steps to operate the present invention in a run mode.

FIGS. 6–11 are flow charts for operating the adaptable engine tachometer device in various modes. FIG. 6 depicts the operational steps related to the "run mode" of the device. The steps of FIG. 6 clear the accumulative engine run time from memory. Process block 234 is the first step for accomplishing this task wherein buttons one and two (B1 and B2) are depressed simultaneously which causes the microprocessor to flash the run time in the lower left corner of the display. At process block 238, buttons one and two are simultaneously depressed which instructs the microprocessor to clear the memory and to reset the run time back to zero for the next counting up of the run time. Processing terminates at end block 242.

Figure 7:
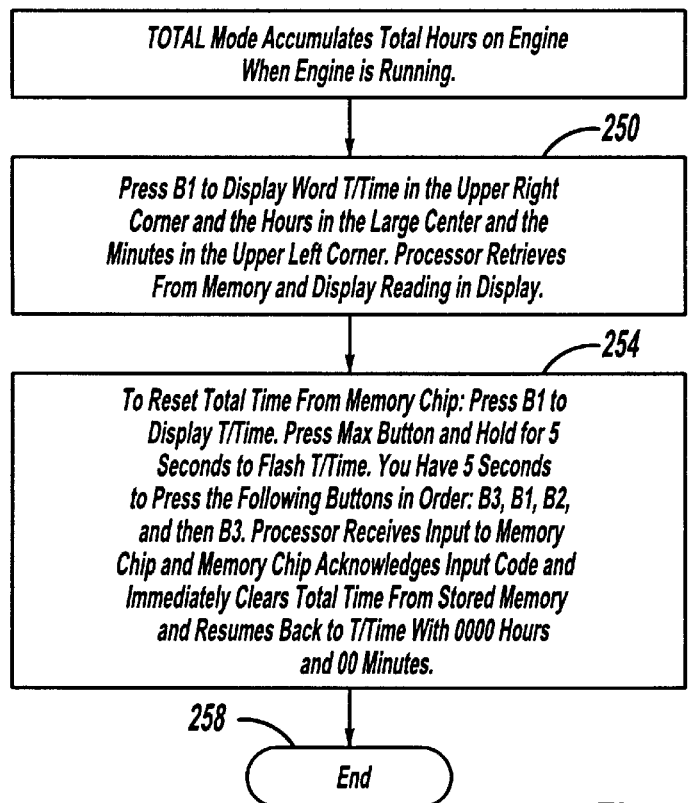
FIG. 7 is a flowchart depicting the steps to operate the present invention in a total mode.

FIG. 7 depicts the operational steps related to the "total mode" wherein the total hours are accumulated while the engine is actually running. At process block 250, button one is depressed in order to display the term "T/Time" in the upper right corner and the hours in the large center and the minutes in the upper left corner. The microprocessor retrieves from memory the current accumulated total hours and then displays that value.

Process block 254 indicates how to reset the total time that had been stored in the memory chip. First, button one is depressed in order to display "T/Time". The maximum button is depressed and held for five seconds in order to flash "T/Time." Within a span of five seconds, the following buttons are depressed in the preferred embodiment in order to perform this particular function: B3, B1, B2 and then B3. The microprocessor receives input to the memory chip and the memory acknowledges the input code and clears total time back to zero hours and zero minutes. The total time is cleared from the stored memory and resumed back to a "T/Time" value of zero hours and zero minutes. Processing for this particular operation terminates at end block 258.

Figure 8:
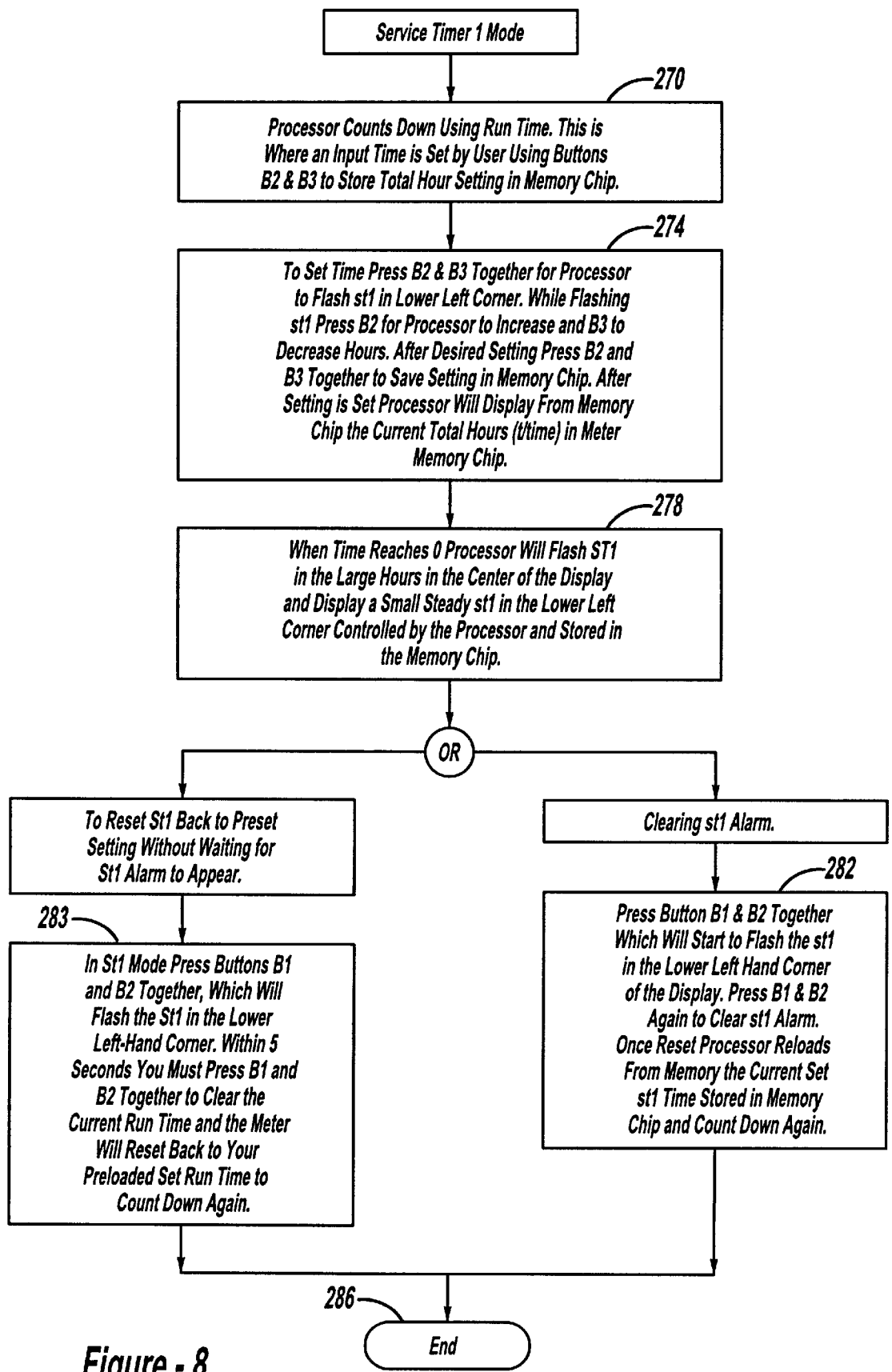
FIG. 8 is a flowchart depicting the steps to operate the present invention in a service timer 1 mode to reset St1 back to preset.

FIG. 8 depicts the operational steps related to the service timer one mode. In this mode, the device counts down from a set number of hours while the engine is running and gives a service signal ("SSSS") to the user when this time has elapsed. The first step is shown at process block 270 wherein the microprocessor counts down depressing the run time. The input is set by the user depressing buttons B2 and B3 in order to store the total hour setting in the memory chip.

Process block 274 shows how to more particularly set the time. To set the time, B2 and B3 are depressed together which causes the microprocessor to flash "St 1" in the lower left-hand corner of the display. While flashing "St 1", B2 is depressed which instructs the microprocessor that the time should be increased while B3 indicates that the hours should be decreased. After the desired setting has been achieved, B2 and B3 are depressed together in order to save the setting in the memory chip. After the time setting is accomplished, the microprocessor displays from the memory chip the current total hours (T/time) that is stored in the memory chip. At process block 278, when the time reaches zero, the microprocessor flashes "ST 1" in the large hours region located in the center of the display as well as a small steady "st 1" in the lower left corner.

The user can execute block 282 or block 283 at this point. Process block 282 indicates the step involved in clearing the "st 1" alarm. At process block 282, the B1 and B2 buttons are depressed which starts to flash the "st 1" in the lower left-hand corner of the display. Buttons B1 and B2 are depressed again to clear the "st 1" alarm. Once the alarm has been cleared, the microprocessor retrieves from memory the current "st 1" time so that the microprocessor can begin the countdown again. Processing terminates at end block 286.

Process block 283 indicates the step involved to reset St1 back to the preset setting without waiting for the St1 alarm to appear. At process block 283, the B1 and B2 buttons are depressed together, which will flash the St1 in the lower left-hand corner. Within 5 seconds the user depresses the B1 and B2 buttons together to clear the current run time. Thereupon, the meter resets back to the preloaded set run time to count down again. Processing terminates at end block 286.

Figure 9:
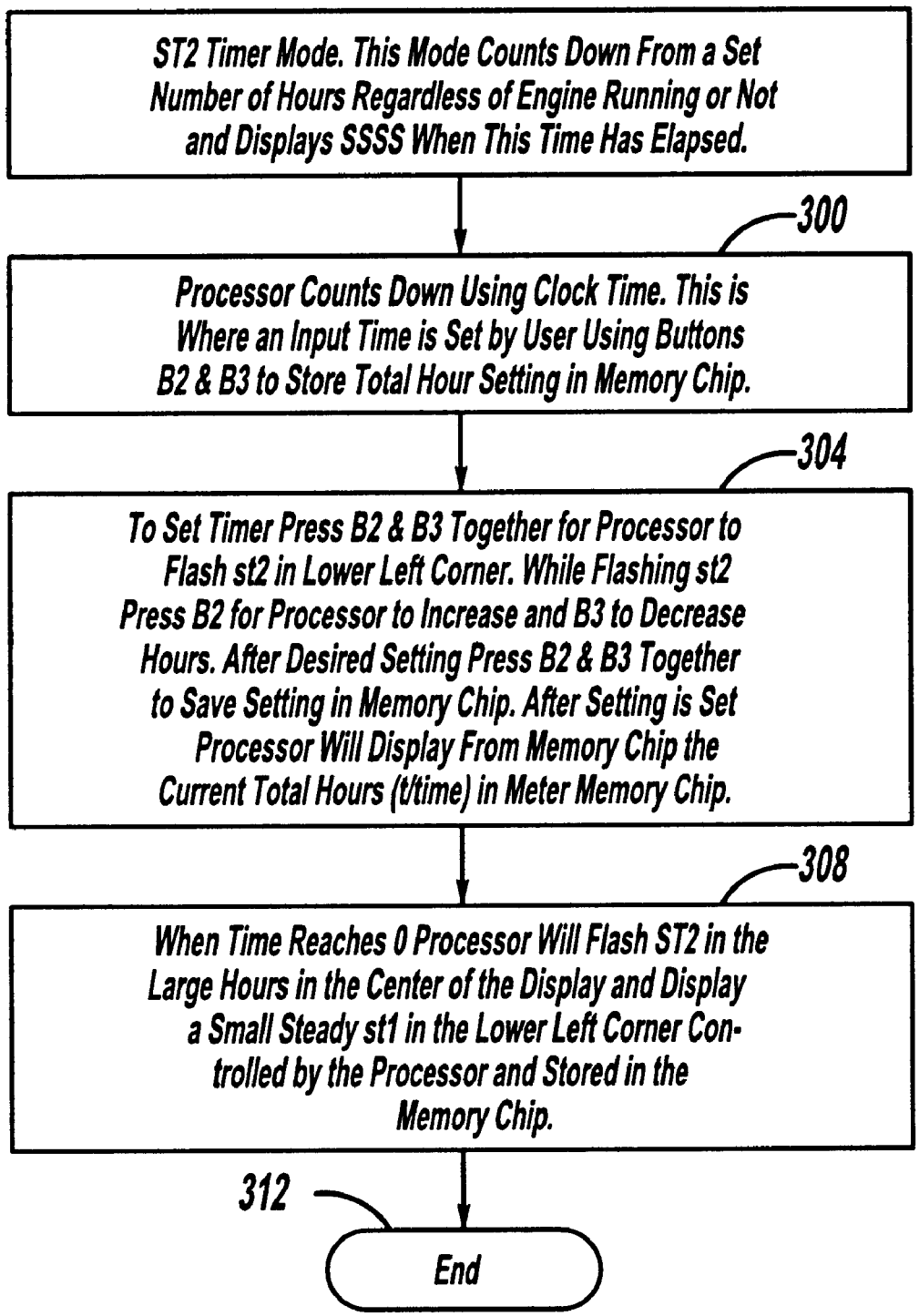
FIG. 9 is a flowchart depicting the steps to operate the present invention in a service timer 2 mode.

FIG. 9 depicts the operational steps related to the service timer two mode ("st2"). In this mode the devices counts down from a set number of hours regardless of whether the engine is running and provides a service signal ("SSSS") to the user when this time has elapsed. The first step in using this particular mode is process block 300. At process block 300, the microprocessor counts down using the clock time. This is where an input time has been set by the user by depressing buttons B2 and B3 to store the total hour setting in the memory chip.

At process block 304, buttons B2 and B3 are depressed together in order to set the timer. The processor flashes "st 2" in the lower left corner. While the "st 2" is flashing, the B2 button is depressed to indicate to the processor to increase the time while B3 is used to decrease the hours.

After the desired setting has been achieved, buttons B2 and B3 are depressed together in order to save the setting in the memory chip. After the setting has been saved, the microprocessor displays the current elapsed total hours and minutes (T/Time). At process block 308, when the time reaches "0", the microprocessor flashes "ST 2" in the large hours region located in the center of the display as well as displays "ST 2" in the lower left corner and displays "call dealer" in the lower right corner. Processing for this particular mode terminates at end block 312.

Figure 10:
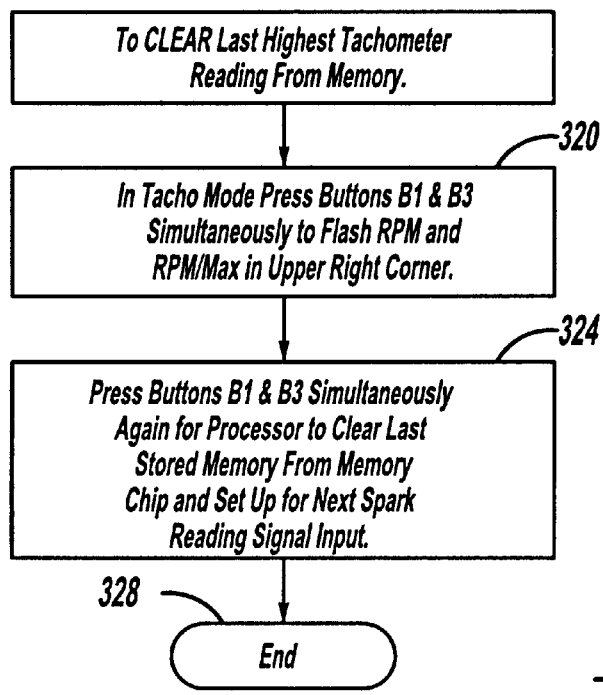
FIG. 10 is a flowchart depicting the steps to operate the present invention in order to perform a clear function.

FIG. 10 depicts the operational steps to clear the last highest tachometer reading from memory. The first step to accomplish this is process block 320 wherein buttons B1 and B3 are depressed simultaneously while in the "tacho" mode. The depressing of these buttons causes the RPM and RPM/Max to flash in the upper right-hand corner of the display. At process block 324, buttons B1 and B3 are depressed simultaneously again for the microprocessor to clear the last stored reading from the memory chip and to set up for the next spark reading signal input. Processing terminates at end block 328.

Figure 11:
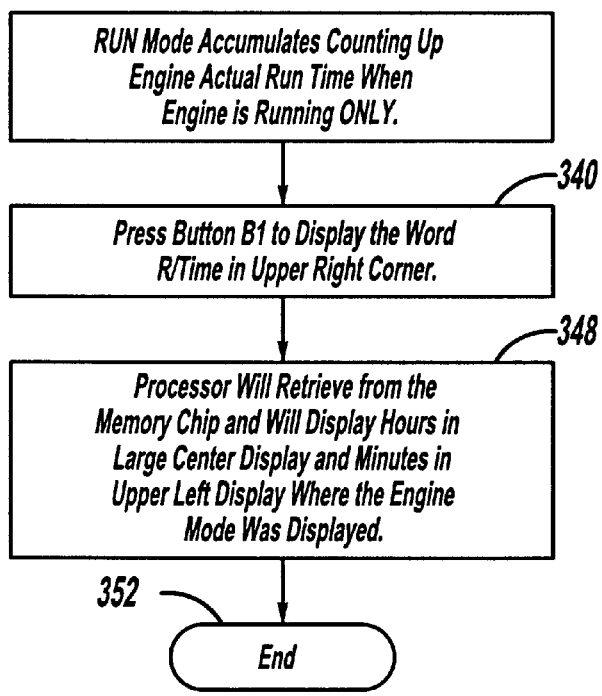
FIG. 11 is a flowchart depicting the steps to operate the present invention in a run mode to accumulate engine actual run time.

FIG. 11 depicts the operational steps related to the "run" mode. In this mode, the unit accumulates the time the engine has been running. The first step is process block 340 wherein button B1 is depressed in order to display the word "R/time" in the upper right corner. At process block 348, the microprocessor retrieves from memory the run time and displays the hours in the large center display and the minutes in the upper left display. Processing terminates at end block 352.

Figure 12:
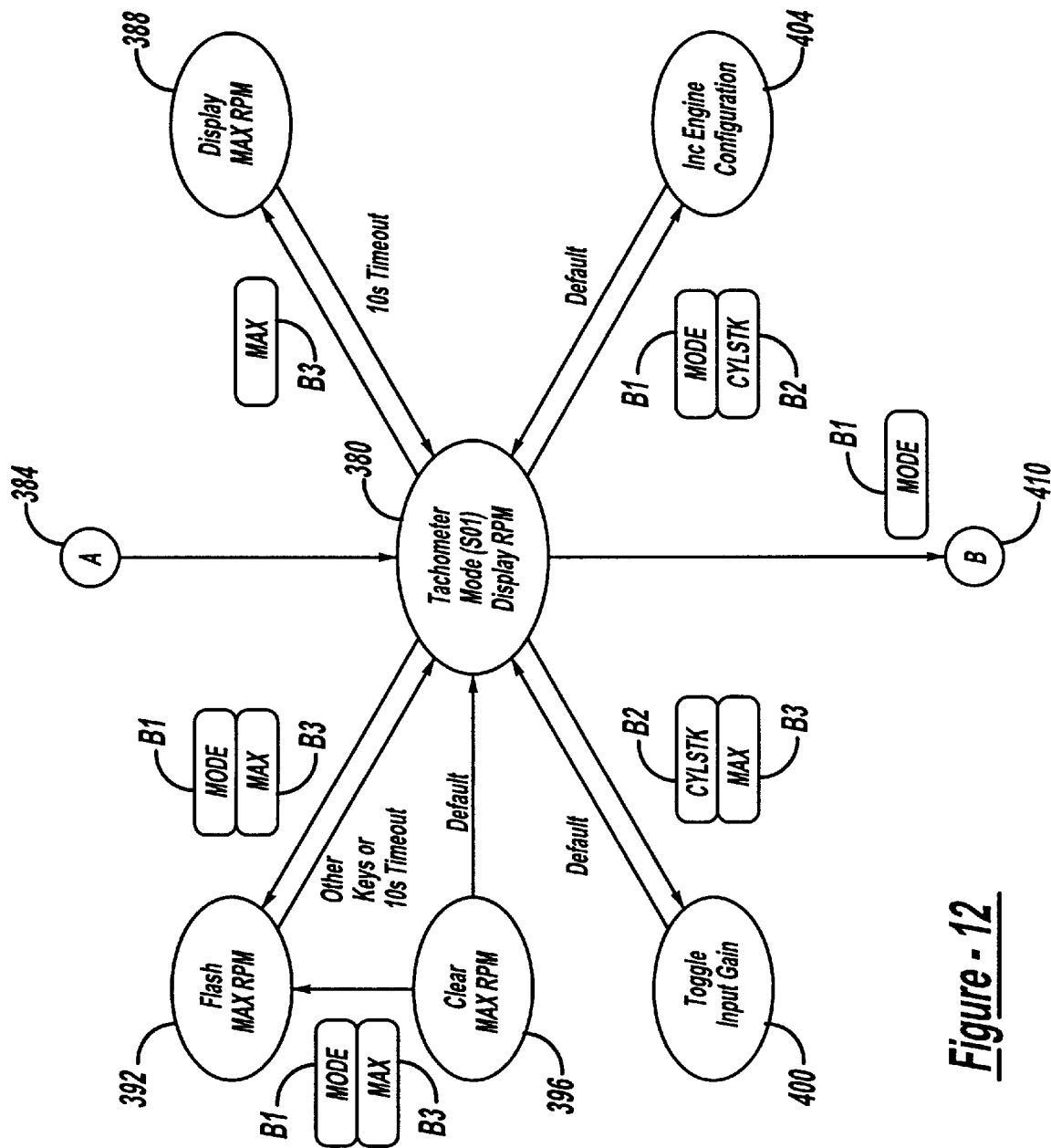
FIG. 12 is a functional flow diagram depicting the button activation sequences related to the tachometer mode.

FIGS. 12–15 depict the button activation sequences to enable the adaptable engine tachometer device to transition between functions and between modes. FIG. 12 depicts the button activation sequences related to the tachometer mode (S01) 380. In the preferred embodiment, tachometer mode 380 is transitioned from the service time two mode as indicated by continuation block A 384. While the adaptable engine tachometer device is in the tachometer mode 380, the display maximum RPM function 388 can be performed by depressing the maximum (B3) button. After a five second time out, the display maximum RPM function 388 is terminated.

The mode button (B1) and Max button (B3) are utilized in order to perform the flash maximum RPM function 392. Upon the user depressing other keys or after a five second time out, function 392 terminates. However, if function 392 is still active and the user depresses buttons B1 and B3, then the clear maximum RPM function 396 is performed. After function 396 has cleared the maximum RPM, the device returns to the tachometer mode 380.

The toggle input gain function 400 is activated by the user depressing the B2 and B3 buttons. After the toggle input gain function 400 has terminated, then the device returns it to the tachometer mode 380. The increment engine configuration function 404 is activated by the user depressing buttons B1 and B2 and then the device is returned to the tachometer mode 380 upon its termination.

While the device is in the tachometer mode 380, the device can transition into the run time mode as indicated by continuation block B 410 by depressing the B1 button.

Figure 13:
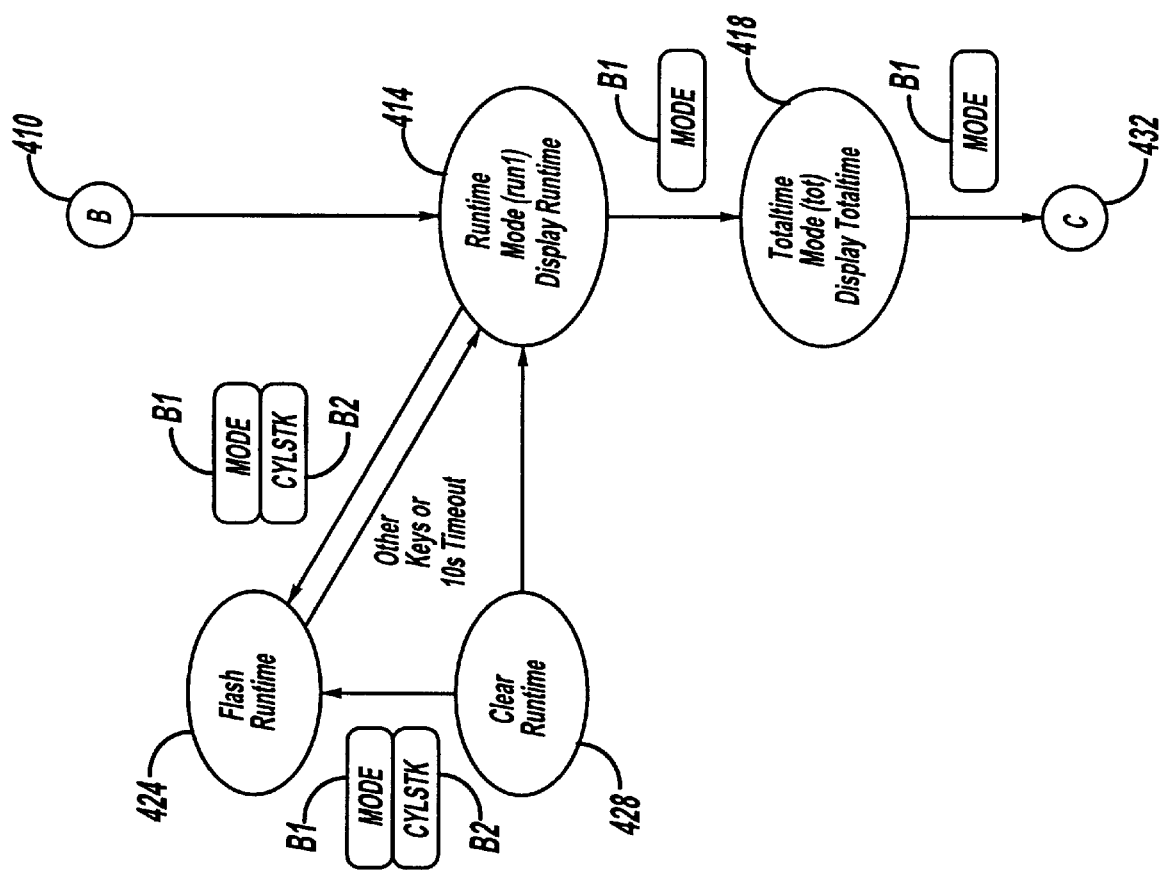
FIG. 13 is a functional flow diagram depicting the button activation sequences related to the runtime mode and total time mode.

FIG. 13 depicts the button activation sequences related to the run time mode 414 and the total time mode 418. While the device is in the run time mode 414, the flash run time function 424 is performed if the user depresses buttons B1 and B2. Upon other keys being encountered or after a five second time out, the flash run time function 424 terminates. However, if the flash run time function 424 is still operating and the user depresses B1 and B2, then the clear run time function 428 is activated.

The device transitions from the run time mode 414 to the total time mode 418 when the user depresses button B1. The total time mode 418 transitions to service time one mode as indicated by continuation block C 432 when the user depresses the B1 button.

Figure 14:
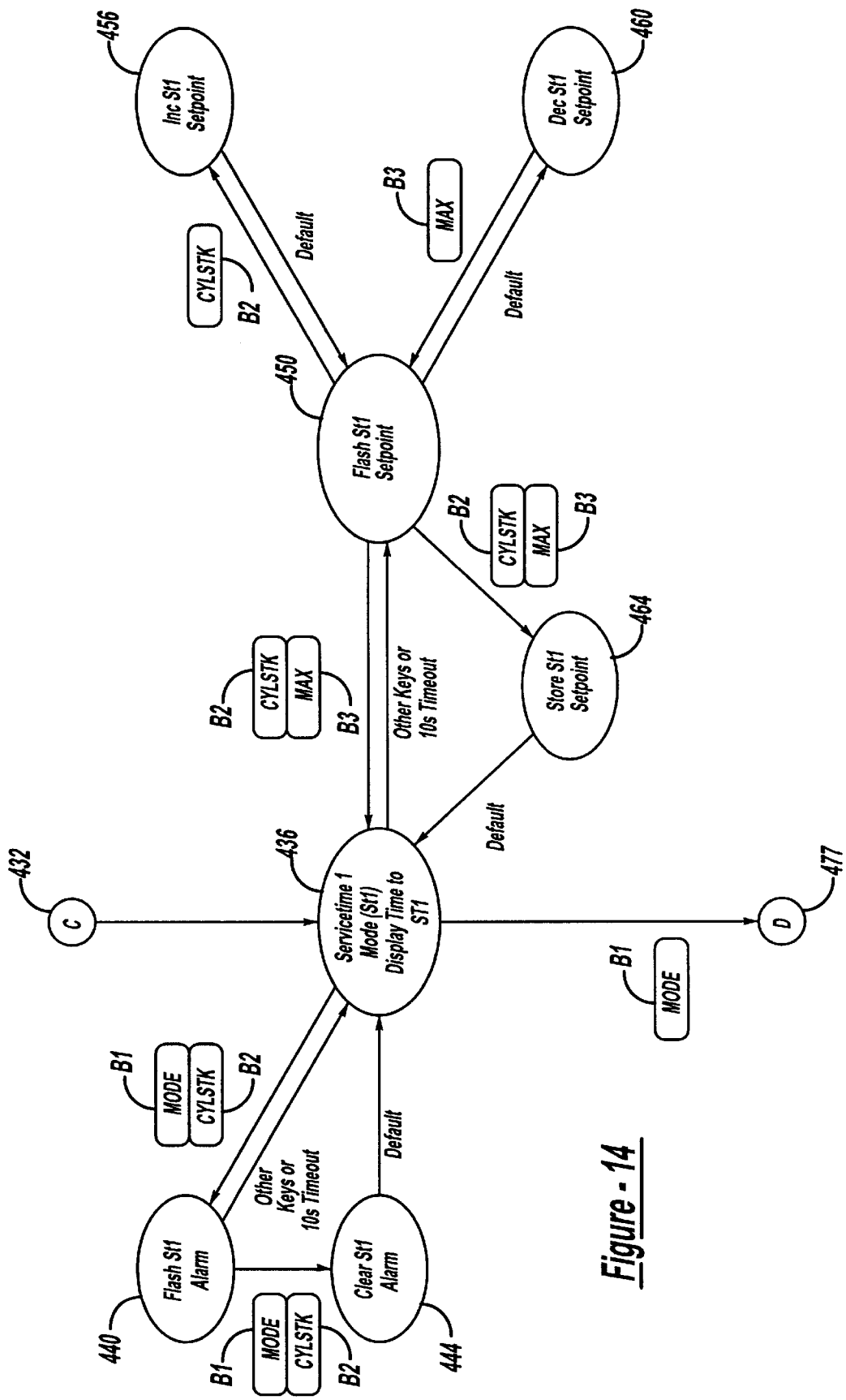
FIG. 14 is a functional flow diagram depicting the button activation sequences related to the service time 1 mode.

FIG. 14 depicts the button activation sequences related to the service time one mode 436. While the device is in the service time one mode 436 and the user depresses the B1 and B2 buttons, the flash "st 1" alarm function 440 is performed. If other keys are encountered or after a five second time out, the flash "st 1" alarm function 440 terminates. However, if the user depresses the B1 and B2 buttons again while the flash "st 1" alarm function 440 is operating, then the clear "st 1" alarm function 444 is performed before returning the device back to the service time one mode 436.

If the user depresses the B2 and B3 buttons while the device is in the service time one mode 436, then the flash "st 1" set point function 450 is performed. If other keys are encountered or after a five second time out, the flash "st 1" set point function 450 returns the device back to the service time one mode 436. However, if the flash "st 1" set point function 450 is running while the user depresses the B2 button, then the increment "st 1" set point function 456 is performed. If the B3 button is depressed while the flash "st 1" set point 450 is running, then the decrement "st 1" set point function 460 is performed. Lastly, if the B2 and B3 buttons are depressed while the flash "st 1" set point function 450 is running, then the store "st 1" set point function 464 is performed.

The device transitions to the service time two mode 480 from the service time one mode 436 when the user depresses the B1 button.

Figure 15:
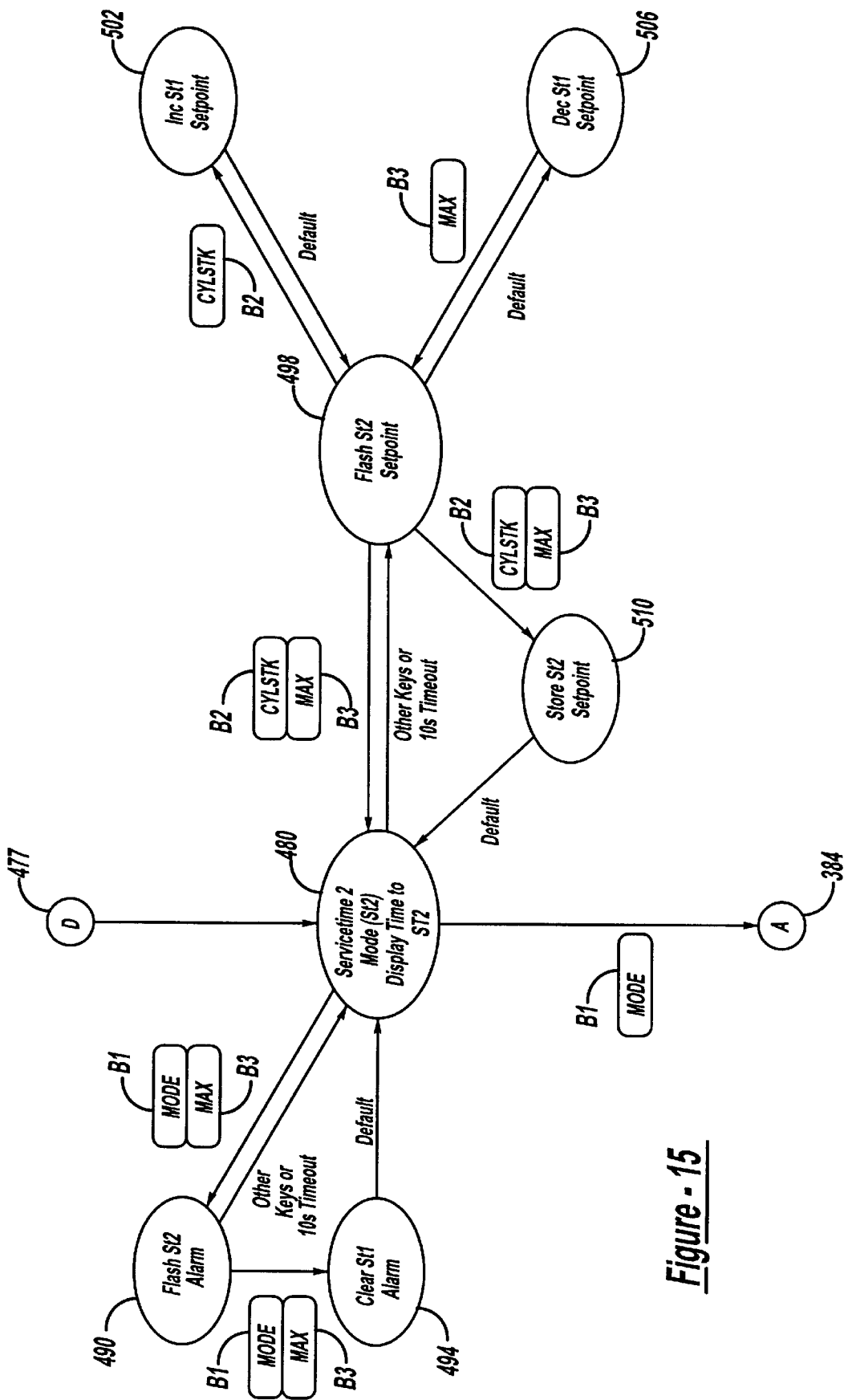
FIG. 15 is a functional flow diagram depicting the button activation sequences related to the service time 2 mode.

FIG. 15 depicts the button activation sequences related to the service two mode 480. If the user depresses buttons B1 and B3 while the device is in the service time two mode 480, then the flash "st 2" alarm function 490 is performed. If other keys are encountered or a five second time out occurs, then the device returns to the service two mode 480. However, if the user depresses the B1 and B3 buttons while the flash "st 2" alarm function 490 is operating, then the clear "st 2" alarm function 494 is performed.

The flash "st 2" set point function 498 is performed when the user depresses the B2 and B3 buttons while the device is in the service two mode 480. If other keys or a ten second time out is encountered, then the device transitions back to the service time two mode 480. However, if the user depresses the B2 button while the flash "st 2" set point function 498 is operating, then the increment "st 2" set point function 502 is performed. However, if the B3 button is depressed while the flash "st 2" set point function 498 is operating, then the decrement "st 2" set point function 506 is performed. However, if the B3 button is depressed while the flash "st 2" set point function 498 is operating, then the decrement "st 2" set point function 506 is performed. Lastly, if the user depresses the B2 and B3 buttons while the flash "st 2" set point function 498 is operating, then the store "st 2" set point function 510 is performed.

The device transitions from the service two mode 480 back to the tachometer mode 380 when the user depresses the B1 button as indicated by continuation block A 384.

While the above-detailed description describes the preferred embodiment of the present invention, the invention is susceptible to modification, variation and alteration without deviating from the scope and fair meaning of the subjoined claims. For example, while the mode transitions have been described herein by certain button activations, the mode transitions can be affected by other mode transition means, such as by including additional buttons to alleviate the user from having to depress two buttons simultaneously.

What is claimed is:

1. An engine tachometer device for determining the revolutions per minute of an engine which generates sparks, said engine having a predetermined configuration, comprising:
    a computer memory for storing different engine configuration data for different engine types, said engine configuration data associating each of the engine configurations with predetermined equations;
    an engine configuration selector for selecting from said computer memory one of said different engine configurations which is indicative of the configuration of the engine; and
    an engine characteristic calculator connected to the engine and to said engine configuration selector and to said computer memory for determining revolutions per minute of the engine based upon said generated sparks and upon the equation associated with said selected engine configuration.

2. The device of claim 1 wherein said engine configuration includes number of engine cylinders and number of engine strokes.

3. The device of claim 1 further comprising:
    a sensor connected to the engine and to said engine characteristic calculator for sensing the number of sparks generated by said engine over a predetermined time interval,
    said engine characteristic calculator determining revolutions per minute of the engine based upon said sensed sparks.

4. The device of claim 1 wherein said device is enclosed in a self-contained case.

5. The device of claim 4 further comprising:
    a liquid crystal display for displaying said determined revolutions per minute.

6. The device of claim 1 where said engine characteristic calculator determines the maximum revolutions per second based upon said determined revolutions per minute.

7. The device of claim 1 further comprising:
    a clock for generating a current time value;
    a servicing time selector for selecting a servicing time value; and
    an engine servicing calculator connected to said engine characteristic calculator and to said clock and to said servicing time selector for generating a servicing indication based upon said selected service time and said generated current time value.

8. The device of claim 1 further comprising:
    a servicing time selector for selecting a servicing time value;
    a running total determinator for determining time duration of operation of the engine; and
    an engine servicing calculator for generating a servicing indication based upon said selected servicing time value and upon said determined time duration of operation.

9. The device of claim 1 wherein said calculator determines miles per hour associated with the input of additional equipment to determine speed.

10. The device of claim 1 wherein the different engine configurations includes at least two engine configurations selected from the group consisting of a one cylinder two stroke engine configuration, one cylinder four stroke engine configuration, two cylinder two stroke engine configuration, two cylinder four stroke engine configuration, three cylinder two stroke engine configuration, three cylinder four stroke engine configuration, four cylinder two stroke engine configuration, four cylinder two stroke engine configuration, five cylinder two stroke engine configuration, five cylinder four stroke engine configuration, six cylinder two stroke engine configuration, six cylinder four stroke engine configuration, seven cylinder two stroke engine configuration, seven cylinder four stroke engine configuration, eight cylinder two stroke engine configuration, eight cylinder four stroke engine configuration, and combinations thereof.

11. The device of claim 1 wherein the different engine configurations includes at least six engine configurations selected from the group consisting of a one cylinder two stroke engine configuration, one cylinder four stroke engine configuration, two cylinder two stroke engine configuration, two cylinder four stroke engine configuration, three cylinder two stroke engine configuration, three cylinder four stroke engine configuration, four cylinder two stroke engine configuration, four cylinder two stroke engine configuration, five cylinder two stroke engine configuration, five cylinder four stroke engine configuration, six cylinder two stroke engine configuration, six cylinder four stroke engine configuration, seven cylinder two stroke engine configuration, seven cylinder four stroke engine configuration, eight cylinder two stroke engine configuration, eight cylinder four stroke engine configuration, and combinations thereof.

12. A computer-implemented method for determining revolutions per minute of an engine which generates sparks, said engine having a predetermined configuration, comprising the steps of:
    storing first engine configuration data that is indicative of a first type of engine;
    associating said first engine configuration data with a first predetermined equation;
    storing second engine configuration data that is indicative of a second type of engine;
    associating said second engine configuration data with a second predetermined equation;
    selecting between said first and second engine configuration data; and
    determining revolutions per minute of the engine based upon said generated sparks and upon the equation associated with said selected engine configuration.

13. The method of claim 12 wherein the first and second engine configuration data include a different number of cylinders.

14. The method of claim 12 wherein the first and second engine configuration data include a different number of strokes.

15. The method of claim 12 wherein the first and second engine configuration data include a different number of cylinders, said first and second engine configuration data including a different number of strokes.

16. The method of claim 12 further comprising the steps of:
sensing the number of sparks generated by said engine over a predetermined time interval,
determining revolutions per minute of the engine based upon said sensed sparks.

17. The method of claim 12 further comprising the step of:
providing a liquid crystal display user interface for use in selecting between said first and second engine configuration data.

18. The method of claim 12 further comprising the steps of:
providing a clock for generating a current time value;
selecting a servicing time value; and
generating a servicing indication based upon said selected service time and said generated current time value.

19. The method of claim 12 wherein the first and second engine configurations include two different engine configurations selected from the group consisting of a one cylinder two stroke engine configuration, one cylinder four stroke engine configuration, two cylinder two stroke engine configuration, two cylinder four stroke engine configuration, three cylinder two stroke engine configuration, three cylinder four stroke engine configuration, four cylinder two stroke engine configuration, four cylinder two stroke engine configuration, five cylinder two stroke engine configuration, five cylinder four stroke engine configuration, six cylinder two stroke engine configuration, six cylinder four stroke engine configuration, seven cylinder two stroke engine configuration, seven cylinder four stroke engine configuration, eight cylinder two stroke engine configuration, eight cylinder four stroke engine configuration, and combinations thereof.

20. An engine tachometer device for determining the revolutions per minute of an engine which generates sparks, said engine having a predetermined configuration, comprising:

a sensor connected to the engine for sensing the number of sparks generated by said engine over a predetermined time interval, said sensor not requiring another sensor proximate to spark plugs of the engine in order to sense the sparks;

a computer memory for storing at least different engine configuration data for at least four different engine types, said engine configuration data associating each of the engine configurations with predetermined equations;

wherein at least two of the engine types include a different number of cylinders and a different number of strokes;

an engine configuration selector for selecting from said computer memory one of said different engine configurations which is indicative of the configuration of the engine; and an engine characteristic calculator connected to the engine and to said engine configuration selector and to said computer memory for determining revolutions per minute of the engine based upon said sensed sparks and upon the equation associated with said selected engine configuration;

wherein the different engine configurations includes at least four engine configurations selected from the group consisting of a one cylinder two stroke engine configuration, one cylinder four stroke engine configuration, two cylinder two stroke engine configuration, two cylinder four stroke engine configuration, three cylinder two stroke engine configuration, three cylinder four stroke engine configuration, four cylinder two stroke engine configuration, four cylinder two stroke engine configuration, five cylinder two stroke engine configuration, five cylinder four stroke engine configuration, six cylinder two stroke engine configuration, six cylinder four stroke engine configuration, seven cylinder two stroke engine configuration, s even cylinder four stroke engine configuration, eight cylinder two stroke engine configuration, eight cylinder four stroke engine configuration, and combinations thereof.

* * * * *